No. 892,089.

PATENTED JUNE 30, 1908.

H. A. SCHNELBACH.
GLASS MOLDING MACHINE.
APPLICATION FILED JUNE 4, 1906.

2 SHEETS—SHEET 1.

WITNESSES.

INVENTOR.

No. 892,089.

PATENTED JUNE 30, 1908.

H. A. SCHNELBACH.
GLASS MOLDING MACHINE.
APPLICATION FILED JUNE 4, 1906.

2 SHEETS—SHEET 2.

WITNESSES.

INVENTOR.
Harry A. Schnelbach

UNITED STATES PATENT OFFICE.

HARRY A. SCHNELBACH, OF CRAFTON, PENNSYLVANIA, ASSIGNOR TO MACBETH-EVANS GLASS COMPANY, A CORPORATION OF PENNSYLVANIA.

GLASS-MOLDING MACHINE.

No. 892,089.         Specification of Letters Patent.         Patented June 30, 1908.

Application filed June 4, 1906. Serial No. 320,067.

*To all whom it may concern:*

Be it known that I, HARRY A. SCHNELBACH, a resident of Crafton, in the county of Allegheny and State of Pennsylvania have invented a new and useful Improvement in Glass-Molding Machines; and I do hereby declare the following to be a full, clear, and exact description thereof.

My invention relates to glass molding machines, and more particularly to that type of machine in which a rotary table travels on a suitable track, said table carrying the molds and the molds being brought around into position to receive the molten glass and the blowing, or pressing, as the case may be, all being performed automatically.

The object of my invention is to provide for the spraying of the molds with a cooling fluid after they have been opened and the finished article removed therefrom, and dispense with the necessity of lowering the mold bodily into a tank of cooling fluid, as has been the general custom heretofore.

To these ends my invention comprises, generally stated, in conjunction with a machine of this character, a rotary table upon which the molds are supported, a track upon which said table travels, blow pipes supported in operative position with reference to said molds, and a movable spraying device located in the possible path of said blow pipes in position to spray the molds as they come around in position after the article formed therein has been removed, the water or other cooling fluid, being supplied from a suitable tank or reservoir.

Figure 1:
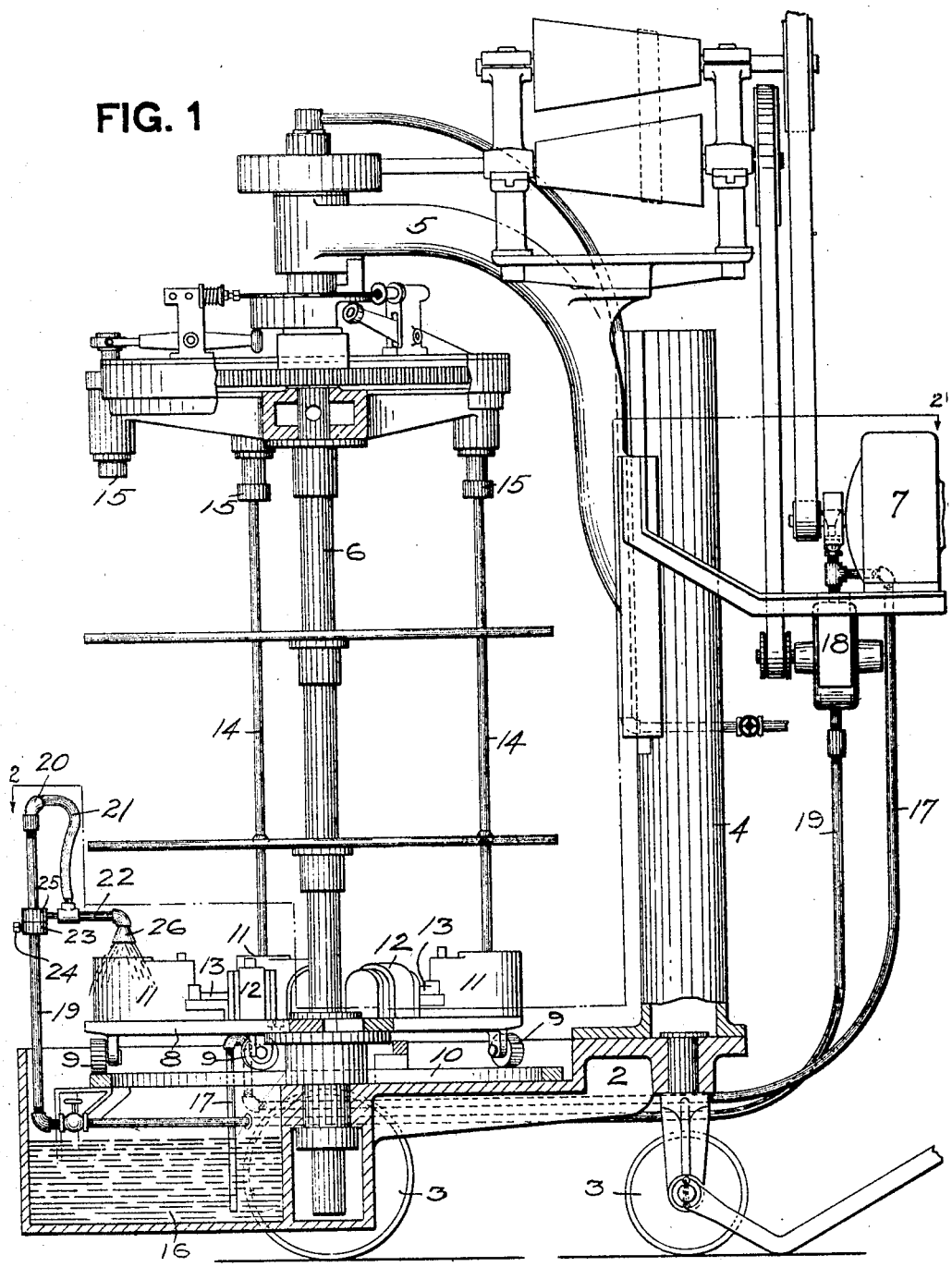
Figure 2:
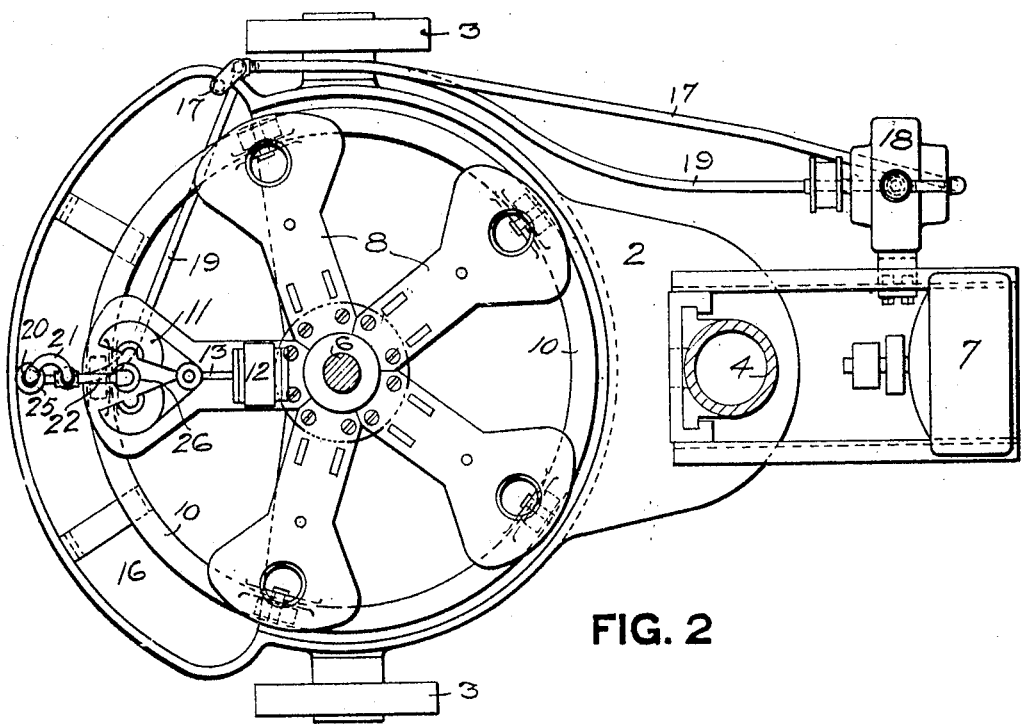
Figure 3:
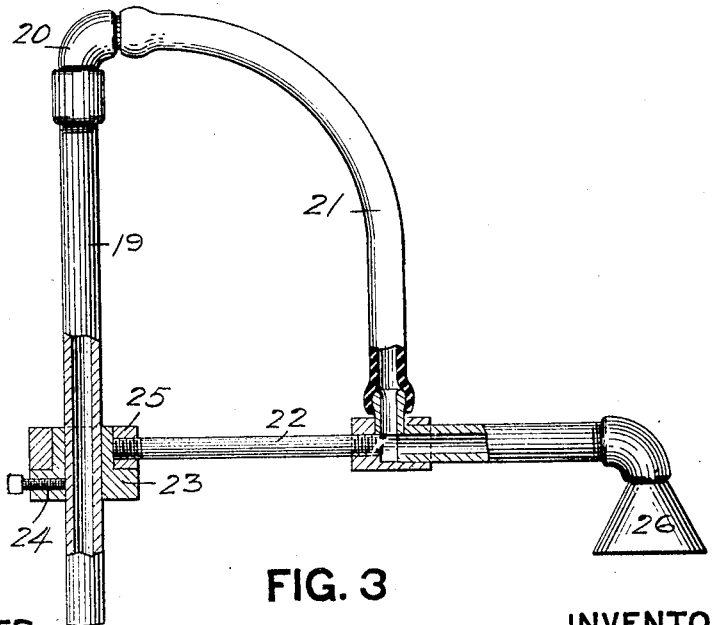

In the accompanying drawings Figure 1 is an elevation partly in section showing my invention; Fig. 2 is a cross section on the line 2—2, Fig. 1; Fig. 3 is a detail view of the spraying device.

Like numerals indicate like parts in each of the figures.

I have illustrated my invention in connection with a well known type of blowing machine, and as my invention does not relate to the mechanism for operating the machine I will only refer to the same generally. The machine is mounted upon the carriage 2, with the supporting wheels 3 by means of which it may be conveyed from one part of the factory to the other. Mounted on the carriage 2 is the standard 4 which carries the overhanging frame 5. A central shaft 6 is journaled in bearings in the overhanging frame 5 to the carriage 2. This shaft is driven by the motor 7 which is connected up by suitable mechanism with said shaft. This shaft, through mechanism which need not be described, acts to rotate the table 8 having the wheels 9 which travel upon the track 10. This table 8 carries the molds 11 which may be of any suitable construction, those shown being the ordinary two-part molds which are adapted to be opened and closed by the power from the cylinders 12 connected up to said molds by the piston rods 13. The blow pipes 14 are adapted to be inserted into suitable sockets 15 and air is conveyed to said blow pipes from a suitable blowing engine. The lower ends of the blow pipes 14 engage the openings of the molds 11.

The operation of the mechanism is entirely automatic and all that the operator has to do is to feed the molten glass to the molds as they come around and insert the blow pipes in position for blowing.

In the carriage 2 is the tank 16 for water or other cooling fluid. A pipe 17 leads from the tank 16 up to the pump 18 by means of which water is drawn from the tank 16 and a pipe 19 leads from the pump 18 to the point 20, where a flexible connection 21 is connected with said pipe and to the swinging arm 22. This swinging arm 22 is swiveled on the pipe 19. A collar 23 is secured to the pipe 19 by the set screw 24. The swivel 25 engages the collar 23 and permits of the swinging of the arm 22 thereon.

When my invention is applied to a machine of the above character, the table 8 carrying the molds 11 travels around on the track 10 and after the article has been blown the mold is opened automatically and the blow pipe removed, together with the article. The mold then passes around in position under the nozzle 26, where the water is sprayed onto the mold to cool the inside and outside of the mold then passing on in position to receive another charge of molten glass. The water being sprayed into the mold over the tank drops back into the tank and the pump 18 operated by the motor 7 draws the water up through the return pipe 17 and discharges it again through the pipe 19 to the spraying nozzle 26. As a consequence the water is used over and over again, and as the molds do not themselves pass down into the water the water is not heated to any great extent, and as a consequence is kept in cooler condition for spraying the molds. In case the operator should for any reason fail to withdraw the blow-pipe, and said blow-pipe should travel around in position to strike the arm 22 carrying the nozzle 26, said arm is capable of swinging or yielding so as to allow the passage of the blow-pipe and not in any way interfere with the operation of the machine.

By my invention I provide for the cooling of the molds without the necessity of lowering the molds bodily into the tank of water which has been the common practice, and which requires that the track upon which the molds travel be cam-like in construction so as to carry the mold down into the water. This method of lowering the molds bodily into the water requires a greater amount of power and creates a strain on the machine, as these molds are very heavy. By my invention the wheels of the rotary table travel on a track all parts of which are substantially in a horizontal plane, so that the power to rotate the table is greatly reduced, while at the same time the water is kept in a cooler condition.

What I claim is:

1. In a glass molding machine, the combination of a rotary table, one or more molds carried thereby, blow pipes in operative position with reference to said molds, a stationary fluid supply pipe, a movable fluid discharging device above said table connected to said supply pipe, said fluid discharging device being in the possible path of said blow pipes, whereby said fluid discharging device may be moved out of the way by the contact of said blow pipes where necessary.

2. In a glass molding machine, the combination of a rotary table, one or more molds carried thereby, blow pipes in operative position with reference to said molds, a stationary fluid supply pipe, and a rotary fluid discharging device above said table connected to said supply pipe in the possible path of said blow pipes, whereby said fluid discharging device may be moved out of the way by the contact of said blow pipes where necessary.

3. In a glass molding machine, the combination of a rotary table, one or more molds carried thereby, blow pipes in operative position with reference to said molds, a stationary fluid supply pipe, an arm mounted to swing on said pipe in the possible path of said blow pipes, a fluid discharging device carried by said arm and connections between said pipe and said device, whereby said fluid discharging device may be moved out of the way by the contact of said blow pipes where necessary.

4. In a glass molding machine, the combination of a rotary table, one or more molds carried thereby, blow pipes in operative position with reference to said molds, a stationary fluid supply pipe, an arm mounted to swing on said pipe in the possible path of said blow pipes, a fluid discharge device carried by said arm and a flexible connection between said pipe and said device.

5. In a glass molding machine, the combination of a suitable frame or support, a tank, a rotary table, one or more molds carried by said table, blow pipes in operative position with reference to said mold, a fluid discharging device over said tank in the possible path of said blow pipes, whereby said fluid discharging device may be moved out of the way by the contact of said blow pipes where necessary, and connections for supplying fluid to said device from said tank.

6. In a glass machine, the combination of a suitable frame or support, a tank, a rotary table, one or more molds carried thereby, a fluid discharge device over said tank in the path of the molds, a pipe leading from said tank, a pump, and a pipe leading from said pump to said discharging device.

In testimony whereof, I the said HARRY A. SCHNELBACH have hereunto set my hand.

HARRY A. SCHNELBACH.

Witnesses:
 ROBT. D. TOTTEN,
 J. R. KELLER.